(No Model.)

3 Sheets—Sheet 1.

C. K. CORLISS.
CAR BRAKE.

No. 365,243.                         Patented June 21, 1887.

Witnesses.

Inventor.
Cyrus K Corliss
By his Attorney
M. Randolph (No Model.) 3 Sheets—Sheet 2.
C. K. CORLISS.
CAR BRAKE.
No. 365,243. Patented June 21, 1887.
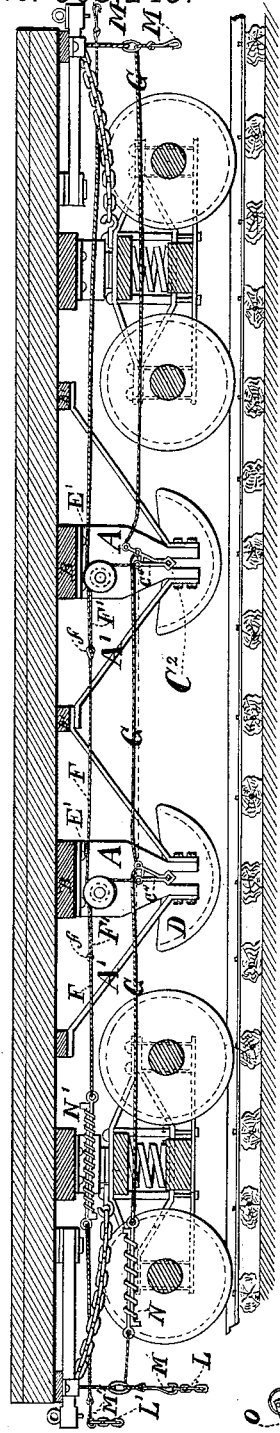
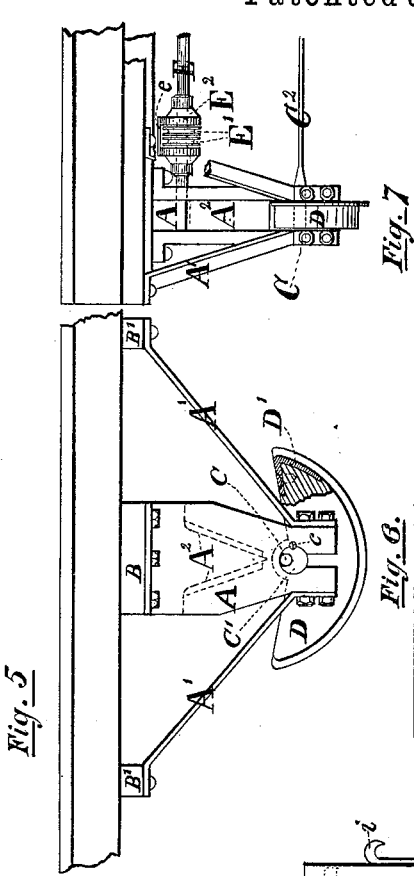
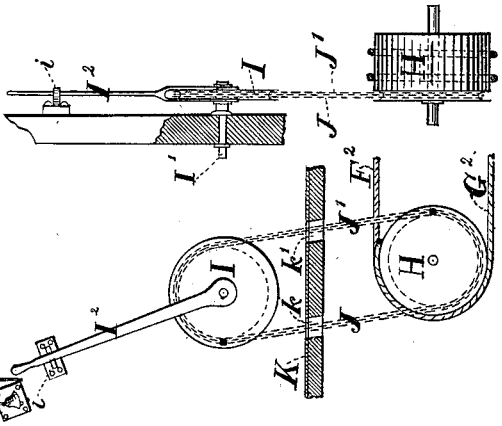
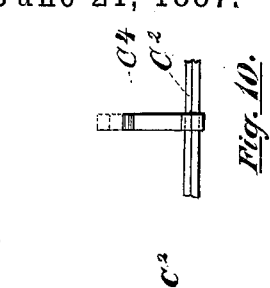
Witnesses.
J. B. Thurston
P. E. Raque
Inventor.
Cyrus K. Corliss
By his attorney
M. Randolph (No Model.) 3 Sheets—Sheet 3.
C. K. CORLISS.
CAR BRAKE.
No. 365,243. Patented June 21, 1887.
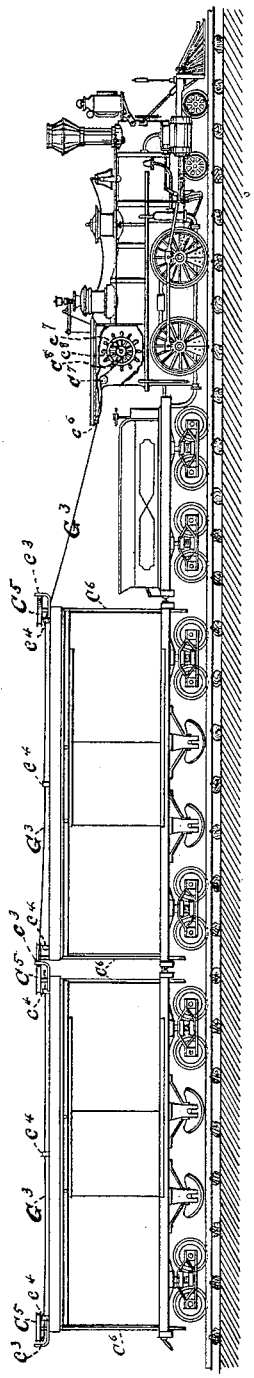
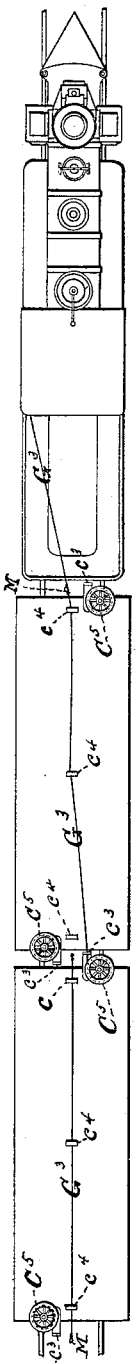
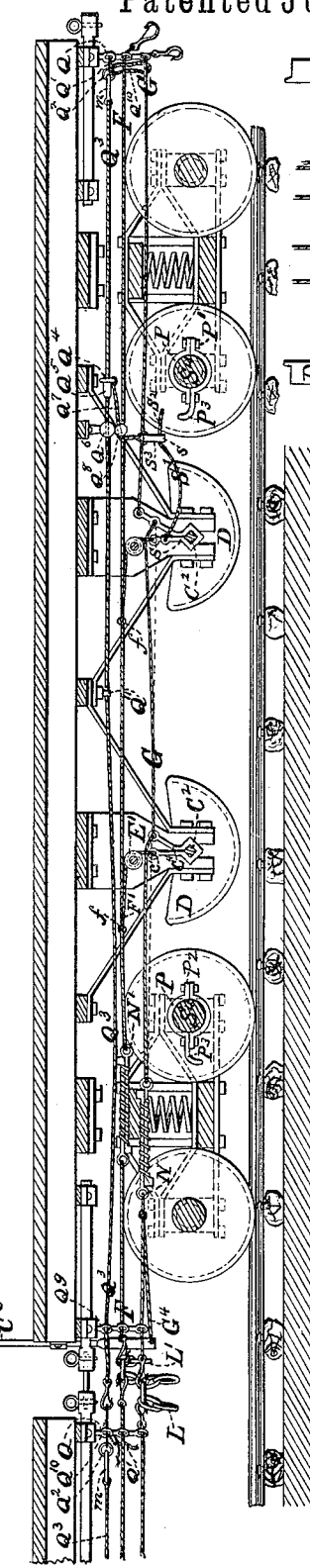
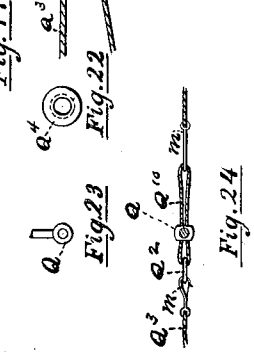
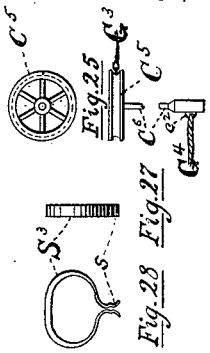
Witnesses.
Inventor.

UNITED STATES PATENT OFFICE.

CYRUS K. CORLISS, OF POUGHKEEPSIE, NEW YORK.

CAR-BRAKE.

SPECIFICATION forming part of Letters Patent No. 365,243, dated June 21, 1887.

Application filed February 5, 1881. Serial No. 25,479. (No model.)

*To all whom it may concern:*

Be it known that I, CYRUS K. CORLISS, of the city of Poughkeepsie, in the county of Dutchess and State of New York, have invented a new and useful Machine or System of Brakes for Stopping the Motion of Trains of Railway-Cars, of which the following is a specification.

My invention relates to a series of double-eccentric or double-cam form brakes attached to the bottoms of railway-cars and arranged to impinge upon the rails of the roadway when required for braking or stopping the motion of the train of cars or of any car or cars thereof, suitable mechanism being provided for the operating of said brakes by the engineer from the locomotive-engine or the cab when the brakes are to be used to stop the motion of a train of cars, or by the fireman from the engine or cab when the brakes are to be used as ordinary train-brakes, or automatically by suitable mechanism when the train is disrupted.

Figure 1:
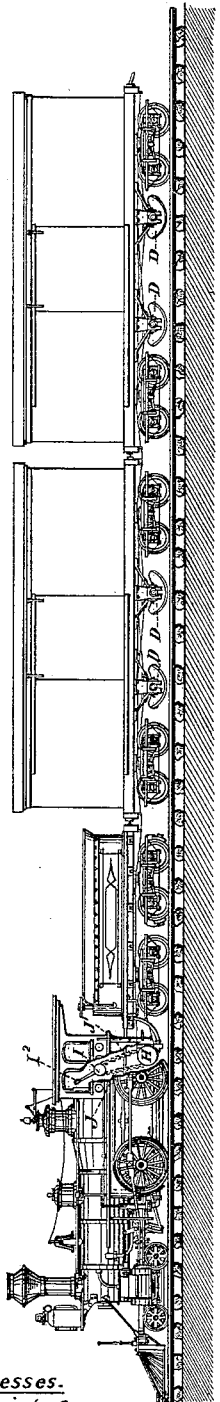
Figure 2:
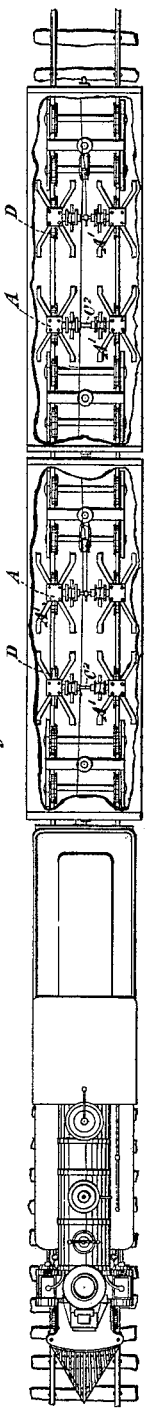
Figure 4:
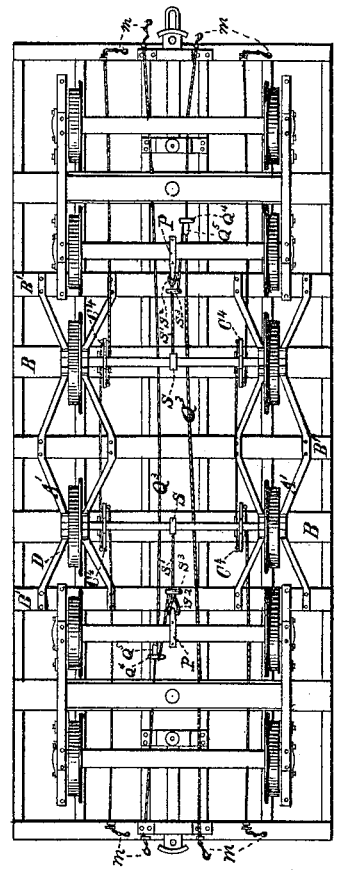
Figure 3:
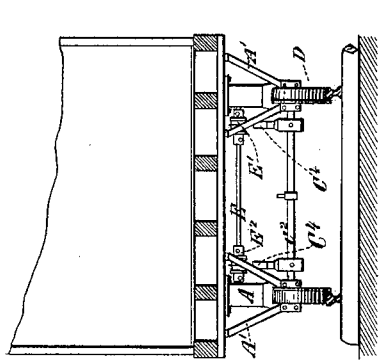

The accompanying drawings, illustrating this invention, are drawn on three sheets, and consist of the following figures, viz: Figure 1 is a side elevation of a locomotive-engine and two freight-cars, showing in general form the new brakes and a part of the mechanism for operating them, a portion of the left side of the engine-cab being broken out to disclose the operating-lever and its attachments, which are located on the right or engineer's side of the cab. Fig. 2 is a general plan of the same parts shown in Fig. 1, the tops of the cars being broken out in this figure, so as to disclose a plan of the brakes and their attachments and fixtures below the said cars. Fig. 3 is an enlarged transverse sectional elevation of one car, showing in elevation the new brakes and their actuating-levers and the guiding-sheaves on which the adjusting-cords are held and guided. The relative position shown in this figure of the actuating brake-levers and the guiding sheaves or rollers for the adjusting-cords need not be construed literally, as the said levers and sheaves may be placed in any desired positions on the shafts or axles and secured in place in any position by means of suitable set-screws. Fig. 4 is an enlarged view showing a bottom plan of one car and the brakes and fixtures attached thereto. Fig. 5 is an enlarged longitudinal sectional elevation of a flat car, showing in detail the operative devices for the brakes of that car, so far as the ordinary use of those brakes is concerned, by means of their motor-cords G and the adjusting-cords F. In this view the actuating or motor cords G are shown raised up above the ends of the brake-levers, to which they are attached, merely for the purpose of showing clearly the brake-arms to which they are attached. The true positions occupied by these cords are shown by the dotted lines in the form of catenary curves. Fig. 6 is a detailed view showing a side elevation of one of the new brakes, with its attached hanger, by means of which it is connected with the car. This view also shows the device adapted for holding the axles of the brakes in their seats in the said hangers. Fig. 7 is a detailed view showing an end or front view of the new brake, with a portion of its operating-shaft $C^2$, also the sheaves for carrying the adjusting-cord and its branch, and also a portion of the rod or axle on which those sheaves are mounted. Fig. 8 is a detailed sectional elevation of one of the new brakes, with its hanger, and the interposed concussion spring or cushion. Fig. 9 is a detailed elevation of the levers for operating the brakes through the shaft or axle $C^2$, a transverse section of which is shown in the lower end of the said lever. The extension of the right arm of the lever in this figure in dotted lines indicates the construction of the rear lever of the rear pair of levers as they occur under every car. Fig. 10 is a front elevation of one of the actuating-levers, also of a portion of the brake rock-shaft or axle $C^2$. The dotted lines at the top of this figure indicate the corresponding parts of the dotted portion of Fig. 9. Fig. 11 is an enlarged view showing a side elevation of the actuating-lever in the engineer's cab, also a portion of the floor of the cab, the alarm-bell in the cab, the actuating drum below the cab-floor, and the driving cord or chain passing through apertures in the cab-floor and transmitting power and motion from the drum of the actuating-lever to the cord-drum below the cab-floor. Fig. 12 is an end elevation showing the parts illustrated in Fig. 11. Fig. 13 is a plan of the actuating-drum below the cab-floor, showing the two brake-cords connected therewith. Fig. 14 is a side elevation of the hook or C-spring used in the engineer's cab to habitually hold the actuating-lever in place when it is not in the act of moving the brakes. Fig. 15 is a side elevation of a locomotive-engine and two freight-cars, showing in general form the new brakes and a portion of the attachments thereto for operating the said brakes as ordinary train-brakes by the fireman or the engineer, a portion of the right or engineer's side of the cab being broken out to disclose the operating mechanism on the fireman's side of the cab. Fig. 16 is a general plan of the parts shown in Fig. 15. Fig. 17 is a longitudinal sectional elevation of a flat car and a portion of the end of another car, showing the new brakes, with their attachments, and the devices for operating them. In this view, like Fig. 5, the true catenary position of the motor-cord G is shown by dotted lines, while the full-line drawing of the said motor-cord shows it raised up above the ends of the operating-levers, so as to more readily show the particular arms of the levers to which it is attached. Fig. 18 is a detailed plan of one pair of car-wheels with their axle, and also one pair of brakes with their rock-shaft, the two wheels and their axle and the two brakes and their axles being combined together into a set for the application of a device to set the brakes on a disruption of the train. Figs. 19 and 20 are respectively front and side elevational views of the guide-post $Q^6 Q^8$, which is used as a guide for the disruption brake-cord $Q^3$ and brake-cord $Q^7$. Figs. 21 and 22 are detailed views of a portion of the disruption brake-cord $Q^3$, together with certain appliances or attachments used in connection therewith for operating the brakes on the disruption of a train. Fig. 23 is an elevational view of one of the guide-posts used in connection with the disruption brake-cord $Q^3$. Fig. 24 shows the manner of connecting the disruption brake-cord between two cars. Figs. 25 and 26 are respectively a plan and an elevation of the horizontal brake-wheel and brake-rods used in connection with the fireman's actuating-cord $G^3$ for operating the brakes as ordinary train-brakes. Figs. 27 and 28 are respectively front and side elevations of a curved spring used to hold up the retrograde disruption cord and loop until it is required for use.

The brake-axle guards or pairs of jaws A under the car are attached by bolts or otherwise to transverse timbers B, extending across the frame of the car and fastened by bolts or otherwise to the frame of the car under the bottom thereof. Each pair of said jaws extends perpendicularly downward, so that the open space between the inner and outer jaw of each pair of said jaws is vertical to the rail down toward which it extends, and each of said jaws is slotted at its lower extremity transversely to the car, the slot being just wide enough to admit the free passage through it of the journal of the brake-axle C, hereinafter described, and the upper ends of the slots are curved so as to rest upon and fit the journal of the said brake-axles when the brakes, hereinafter described, are in operation. In a circular expansion of said slot, far enough above its lower extremity to be thereby furnished with a sufficient support for the box C' and the axle that rests upon it, a circular box or bearing, C', is inserted laterally and made fast by the screw c, screwed in tightly between the box C' and the jaw A. By unscrewing and removing this screw c, and rotating the box C' about one hundred and eighty degrees in said circular expansion, the said journal and axle and their attachments may be easily and quickly removed downward through the slot and be wholly detached from said box and jaws when necessary for repairs or for any other purpose. This box C' bears the journal of the brake-axle C high enough for the curved upper end of the slots to fit closely but not tightly to and over the said journals, so as to admit of the easy partial rotation backward and forward of the axle C under them, as hereinafter described. The said jaws A are made sufficiently broad and thick to be strong and powerful enough to elevate the car and its load and the trucks attached thereto, as hereinafter described, and to support and sustain and aid the braces A', hereinafter described, in the performance of their appropriate functions.

The brake D is a double-eccentric or double-cam form brake consisting of the eccentricated section of a wheel or of a half-ellipse or double eccentric or double cam D of sufficient thickness to give it the requisite strength, and eccentricated as much as possible without depriving it of the power of rotation when operated as hereinafter described, and is mounted tightly on an axle, C, of sufficient diameter to give it the required strength, and long enough to extend from the outer surface of the inner jaw to the outer surface of the outer jaw of said pairs of jaws A, and is so tightly mounted on said axle C that it always partially rotates or rocks with the partial rotation either backward or forward of its said axle C. The upper part of the cams or brakes D, as they hang when at rest, as hereinafter described, should extend above a horizontal line passing longitudinally through the cams or brakes D and the center of their axles C, about one-sixth of the transverse diameter of the brakes D, so as to secure a longer leverage to liberate the brakes D when they have been operated as hereinafter described. A pair of said brakes D, consisting of said eccentricated sections of wheels or half-ellipses or cams D, so mounted on their axles C, with the inner ends of the axles C, connected together by the rock-shaft $C^2$, of much smaller thickness than the brake-axles C, but of sufficient thickness to give it the requisite strength by welding the ends of the said rock-shaft $C^2$ to the inner ends of the two opposite axles C, or otherwise, is supported by the said boxes C', by the journals of the said brake-axles C being rested transversely to the car in the two boxes C' opposite to each other, one in each outer jaw of the said pairs of jaws A. When said journals are so rested in the said boxes C', the said brakes D, consisting of the eccentricated sections of wheels or half-ellipses or cams D, are thereby suspended so as to be able to partially rotate backward and forward in the open space between the jaws A, which is just wide enough to allow them to easily thus rotate directly above the rails, and also upon the rails, and the said jaws A extend downward just far enough to leave sufficient space between the boxes C' and the top of the rails to admit of eccentricated sections of wheels or half-ellipses or cams D, of sufficient size or dimensions to enable them by partial rotation, as hereinafter described, to neutralize the traction of the car-wheels, as hereinafter described. When the said eccentricated sections of wheels or half-ellipses or cams D are so suspended, as above stated, the shortest radius of each is extended rectilinearly vertically toward the rail, above which it is suspended, and they are so suspended vertically over and above the rails high enough to not be brought down to and in contact with the rails by the yielding of any of the springs under and attached to the car, and at such a height that by mechanical force of a lever or otherwise the eccentricated curve or periphery thereof may, by rotating them on their axles C about forty-five degrees, or more, or less, according to the extent of the eccentrication thereof, or of the long axis of the half-ellipsis, be brought in contact with the rail, and they be thereby made to acquire traction on the rails when the car is in motion. On the inner side of the periphery of said eccentricated sections of wheels or half-ellipses or cams D is a flange cast therewith or otherwise connected therewith to keep them on the rails. On the curve of said cams or brakes D at their ends, and attached thereto by screws or by being dovetailed into the face of the curve or otherwise attached thereto, is a shoe, D', of the width of the face of the curve, with a still shorter curve at the toe or end of said shoe D'. as shown in Figs. 6 and 8, and of convenient length, on which they slide on the rails when the traction of the car-wheels is neutralized, as hereinafter described. Between the said jaws A is a transverse cuneiform barrier, A², cast therewith or otherwise made and attached thereto, with its thin end extending vertically downward toward the center of the said brake axle. The rotation in either direction of the said eccentricated sections of wheels or half-ellipses or cams D is arrested by the said barrier A² between the said jaws A at the instant when the elevation of the car and its load and the trucks connected therewith has neutralized the traction of the car-wheels, and the said eccentricated sections of wheels or half-ellipses or cams D have commenced sliding on their shoes D' on the rails. The said barrier A² is faced with vulcanized caoutchouc a, or is faced or provided on its face with any elastic material or spring, in order therewith to gradually arrest the rotating motion of the said eccentricated sections of wheels or half-ellipses or cams D, and thereby moderate their impact against said barrier and deaden its consequent concussion.

Strong braces A', attached to and extending from a point or line on the front and rear edges or surfaces of each jaw of the pairs of jaws A, opposite the center of the said axle-journals, extend diagonally upward, forward, and rearward to transverse timbers B', and are there fastened by bolts or otherwise to the bottom of the frame of the car. The inner braces A' diverge also inwardly from a longitudinal line sufficiently transversely to force the jaws A to remain in their normal position vertical to the rails, and thereby to force the brakes D, when operating, to remain on the rails, and the outer braces A' diverge also outwardly from a longitudinal line sufficiently to operate both transversely and longitudinally, and thereby aid the inner braces A' to keep the jaws A in their normal position vertical to the rails, as shown in Fig. 4. The said braces are made sufficiently broad and thick to be strong and powerful enough to enable the friction of the above-mentioned shoes D', while sliding upon the rails when the car is in motion, to resist and gradually absorb and diminish the momentum and speedily stop the motion of the car.

A rod, E, is extended transversely to the car, and about an inch higher than the ring c' in the forward end of the bar C³, hereinafter described, and vertically and parallel to the said rock-shaft C², one end of which rod is firmly fastened to the outer face or into the outer face of the inner jaw of one of said pairs of jaws, and the other end of it is firmly fastened to the outer face or into the outer face of the inner jaw of the pair of said jaws directly opposite thereto.

Upon the said rod E, at two points thereon, one on each side of the middle thereof, are loosely mounted two grooved sheaves, E', confined within the sliding frame E², which, by means of set-screws or otherwise, may be fastened to said rod at any point on each side of the middle thereof. The bar e, extending over the two grooved sheaves E' and connecting together the parts of the said sliding frame, serves also to confine the two cords F and F', hereinafter described, to the grooves of said sheaves E'. The object of mounting the said sheaves within the said sliding frame is that they may be placed as near the point of equidistance from both sides of the car as possible, in order to prevent the hereinafter-described flexible wire cords F and G from being broken, while a train of cars, furnished with the brakes D, herein described, is moving on a curve. The said rod E and its fastenings and the sheaves E' mounted thereon are made strong enough to withstand a strain upon them, through said cords F and F', sufficient to overcome their tensile strength and part them.

The two arms or levers C⁴, the shorter ones of which correspond in length with the length of the shortest radius of the said eccentricated sections of wheels or half-ellipses or cams D, or with any other convenient standard of length that may be adopted, in order to easily rock therewith the rock-shaft C², are fastened in two places to the rock-shaft C², one set of them to each side of the middle thereof, as shown in Fig. 4, by being looped and so bolted around it or otherwise fastened to it that they may be easily and promptly loosened and slid and fastened to any point on the rock-shaft C², to which the said sheaves E' may be vertical. One of the two arms or levers C⁴ diverges longitudinally upward and rearward from the point where they are fastened to said rock-shaft C² at an angle of about twenty-two and a half degrees rearward from a line rising perpendicularly from the center of said rock-shaft C². The other one of said arms or levers C⁴ rises perpendicularly therefrom. These arms or levers C⁴ so extend upward from the rock-shafts, as above described, when the brakes D are balanced and at rest.

The diverging lever of the levers C⁴, attached to the rear rock-shaft, C², under the tender and under every car, is about one-third longer than the perpendicular lever connected therewith, and the cord G, extending rearward from its connection with the lever attached to the forward rock-shaft of the tender and of a car, is attached to the elongated lever at a point thereon about one-third of its length from its upper end. The object of this elongated lever is to rotate the brakes D of the car next to the rear to the point thereon at which they acquire traction on the rails more speedily, so as to secure the automatic operation of the brakes D of this latter car before the brakes D of the preceding car have ceased to rotate on the rails.

A bar, C³, with a ring, c', in its forward end, is fastened to and connects together the upper ends of said two arms or levers, C⁴, which with their said connecting-bar C³ and the ring c' are made strong enough to overcome the tensile strength of said cords F and F' and break and part the cord F in case of a disruption of a train of cars and a consequent extraordinary strain upon them.

Two pairs of the brakes D, as above described, with all their said attachments, are attached to the frame of each and every car, as above described, between the forward truck and the rear truck thereof, and each pair of said brakes D is attached in the same manner to the frame of the car, so that the forward pair of brakes D will be as near as possible to the forward truck, and the rear pair of brakes D as near as posible to the rear truck of the car.

Near the rear end of the cab and under the right side of the bottom thereof is mounted on a shaft suspended by hangers from the bottom of the cab, transversely and horizontally, a drum, H, of suitable length to receive and impart motion through cords, as hereinafter described, its diameter being twice the length of the perpendicular arm or lever of the arms or levers C⁴, the journals of said shaft resting so as to rotate or rock backward and forward in boxes contained in said hangers, which hangers are firmly attached to the bottom of the cab.

At a convenient point or place within the cab and on the right-hand side thereof a grooved wheel, I, is loosely mounted on an axle, I', attached thereto and projecting horizontally therefrom and at right angles therewith. The diameter of this wheel I is proportioned to the diameter of the drum H, so that when it is rotated on its axle about forty-five degrees the said cords F² and G², as hereinafter described, may be thereby wound and unwound reversely to each other around and from the said drum H, so as to rotate or rock the shaft C² and the axles C, to which they are fastened, as above described, until the eccentricated sections of wheels or half-ellipses or cams D, mounted on their said axles C are rotated so far as to bring the periphery of said eccentricated sections of wheels or half-ellipses or cams D down to and in firm contact with the rails.

From a convenient point on the periphery of the wheel I one of its radii is supplemented by a lever, I², about thirty inches in length, attached thereto. When the shortest radius of the said eccentricated sections of wheels or half-ellipses or cams D is extended vertically in a straight line downward toward the rails, the said brakes are balanced and at rest, and the upper end of said lever I² is at its place of rest, and is confined there by an easy working C-spring, i, or otherwise, which permits the levers to be easily and promptly removed therefrom when operated, and also to escape therefrom automatically in case of a disruption of the train.

To the center of the front curve of the periphery of the wheel I is firmly attached the end of a flexible wire cord or chain, J, of sufficient strength to rotate the said rock-shaft C² by means of its levers C⁴ and the brakes D, connected therewith, as hereinafter described, which is thence extended taut downward upon the periphery of the wheel I, and thence rearward thereunder through an orifice, k, in the cab-floor K, directly to and taut around under the bottom curve of the periphery of the drum H, and thence extending tightly against and on the same upward to a point thereon in the same horizontal plane with the center thereof, where the end of this cord or chain J is firmly attached to the periphery thereof.

Should the drum H be made with a smaller diameter than that above described, then the said cord or chain J must be wound under and around said drum H before its end is attached thereto, as above described, a sufficient number of times to wind up and pay out the cords F² and G², hereinafter described, to the extent necessary to operate the levers C⁴, the rock-shaft $C^2$, and the brakes D, as hereinafter described.

To the center of the front curve of the periphery of the wheel I is firmly attached a cord or chain, J', similar to said cord or chain J, which is thence extended taut rearward upon and over said wheel I, and thence through an orifice, $k$, in the cab-floor K, directly to and tightly upon and around over the said drum H, and thence to the center of the rear curve thereof, where it is firmly attached thereto. Should the drum H be made with a smaller diameter than that above described, then the said cord or chain J', above described, must be wound upon and over and around the same before its end is attached thereto, as above described, a sufficient number of times to wind up and pay out the said cords $F^2$ and $G^2$ to the extent necessary to admit of the operation of the levers $C^4$, the rock-shaft $C^2$, and the brakes D, as hereinafter described, and through the reverse operation of the lever $I^2$ to bring the brakes D into the position where they are at rest.

To the front curve of the drum H is firmly attached the middle of a cord or chain similar to said cord or chain J, the upper half thereof, $F^2$, thence extending taut rearward over, and the lower half thereof, $G^2$, thence extending taut rearward under the said drum H to the rear of the cab, the free ends thereof there terminating with guarded or snaffle-hooks M. The drum H may be of less diameter than that above described; but in that case these cords $F^2$ and $G^2$ must be tightly wound from their points of attachment thereto reversely around the same a sufficient number of times to wind up and pay out the actuating-cord G and the adjusting-cord F to the extent necessary to operate the rock-shaft $C^2$ and the brakes D through the levers $C^4$. The forward terminal hook of said cord G under the tender, or next car to the locomotive-engine in the train, if there be no tender, is connected with the free end of the cord $G^2$ by this terminal hook and that of the cord $G^2$ being hooked into the chain L, so that the chain L and the cord $G^2$ and the cord G under the tender or next car to the locomotive-engine will be taut when the couplings coupling the locomotive-engine with the tender or next car to the rear are extended to their extreme length, and the forward terminal hook of the cord F under the tender or car next to the locomotive-engine in the train is connected with the free end of the cord $F^2$ by this terminal hook and that of the free end of the cord $F^2$ being hooked into the chain L', so that the chain L' will be taut when the couplings coupling the locomotive-engine with the tender or car next to the rear are extended to their extreme length.

The cord G is firmly attached to the upper end of the right arm or lever $C^4$, fastened to the forward rock-shaft, $C^2$, attached to the brakes D, attached to the tender, or to the first car in the train, if there be no tender, that diverges toward the rear of the tender, or of the first car in the train, if there be no tender. This cord G is thence extended taut under the tender toward the forward end of the tender, or first car in the train, if there be no tender, and there terminates with a hook similar to those above described. The said cord G and the free end of said cord $G^2$ are, as already described, connected together by hooking their said terminal hooks into the chain L, hereinafter described. These two cords, G and $G^2$, so connected together, are taut when the couplings coupling the locomotive-engine with the tender, or next car to the rear of the locomotive-engine, if there be no tender, is extended to its extreme length. A similar cord is fastened at one end thereof to the upper end of the arm or lever attached to the forward rock-shaft, $C^2$, under the tender, or first car in the train, if there be no tender, and thereto attached, that diverges toward the rear end of the tender, or first car, if there be no tender, and is thence extended taut to and firmly fastened to the arm or lever $C^4$, attached to the rear rock-shaft $C^2$, under and attached to the said tender, or said first car, if there be no tender, which diverges toward the rear at a point thereon about one-third of its length from its upper end, and is thence extended taut toward the rear end of said tender, or first car, if there be no tender, and terminates there with a hook like those above described. A similar cord is fastened to the upper end of the arm or lever $C^4$, attached to the forward rock-shaft, $C^2$, attached to the axles of the brakes connected with the next car to the rear in the train that diverges toward the rear of this second car, and is thence extended taut to the forward end of the second car in the train, and there terminates with a hook similar to those above described. The said last two sections of the cord G are connected together by hooking their said terminal hooks into the chain L, and are just sufficiently slack when the couplings coupling together the said first and second cars, or said tender and first car, are extended to their extreme length to admit of rotating the brakes D of the tender or first car to the point on the periphery thereof at which they acquire traction on the rails, as above described; and the levers fastened to the rock-shaft $C^2$ of the pairs of brakes attached to this second car, and to all the other cars in the train, are connected together by similar cords and in a similar manner to those of the pairs of brakes attached to said first and second cars; and under every car in the train a similar cord, G, is attached to and extended from the levers of the rock-shaft $C^2$ of the pairs of brakes D of every car in the train to the levers $C^4$ of the rock-shaft $C^2$ of the pairs of brakes D, attached to the next car to the rear of it in the train, and connected therewith in the same manner as the levers fastened to the rock-shaft $C^2$, connected with the brakes D of the said first car, are, as above described, connected with the said levers fastened to the rock-shaft $C^2$, connected with the brakes D of the second car in the train. The said flexible wire cord or chain F is of so much less tensile strength than that of the said cord G that when both of said cords are subjected to an equal extraordinary strain, as in case of a disruption of a train of cars, the cord F will be first disrupted. The said cord F is extended from its said connection with said cord F² taut in sections from car to car in the train, on the right of the center of the train, by means of terminal hooks similar to those above described, being hooked into the chains L', and they respectively are extended to and upon and over the right sheave of the two sheaves E', mounted on the rods E in the train of cars, and the other end of the cord F extends to the rear end of the last car in the train and terminates there with a hook like those above described. This cord F, when so attached at the forward end thereof and also near the rear end thereof by the terminal hook of the cord F' being hooked into the ring $c'$ and so connected together in sections by the chains L', should be taut when all the couplings coupling together the cars in the train are extended to their extreme length. To the said cord F along its whole length, at points thereon at least ten inches forward of the nearest thereto of every pair of said sheaves E', a ring, $f$, is attached, to every one of which, by means of a terminal hook similar to those above mentioned fastened thereto, a cord, F', similar to the cord F, is attached, every one of which is thence extended taut toward the rear to and passed upon and over the nearest left sheave of said sheaves E', and thence extended perpendicularly and taut down to and is attached to the said ring $c'$ in the forward end of said bar C³ by hooking its other terminal hook, M, therein.

The object of the cord G is to transmit power and motion to the rock shaft C² and the brakes D from and by the power applied to operate the lever I², and thereby operate the brakes D. The object of the cord F and the branch adjusting-cords F' is to bring the brakes D into a position of rest by a reverse operation of the lever I², and to hold them in such position after they have been operated and until operated again.

For convenience in replacing the cord G and also the cord F and the cords G² and F², herein described, when broken and parted by the disruption of a train of cars or otherwise, the said cords and their connecting-chains must have under the cab and under the tender greater tensile strength than at any other point or points under the train, so that the breaking and parting of said cords and chains will be thereby forced to take place to the rear of the tender in case of such disruption of the train. The sections of the said cords G and F terminate with hooks similar to those above described, fastened thereto at the ends thereof at both ends of every car, and they are connected together and made continuous by hooking the terminal hooks thereof into the links of their said respective short chains L' and L, and said short chains L' are taut when so hooked; but said short chains L when so hooked are slack, as already above described, when the couplings coupling together the cars in a train are extended to their extreme length. These short chains L' and L are made with suitable links and of convenient length, so as to connect the said cords together by their terminal hooks M, as above described, at a longer or shorter distance from each other, according to the longer or shorter length of the car-couplings coupling together the cars in a train.

When a car is to be reversed in a train, the connecting-chains L' and L at each end of the car must be detached by being unhooked from said cords, and when the car is reversed in the train the terminal hooks of the cords G and F, extending under the right-hand side of the car as it stands reversed, must be connected together by the chains L' and L, in the manner above described. When the motion of a train of cars is to be reversed by changing the locomotive-engine to the other end of the train, every chain L' and L must be detached at one end thereof by being unhooked from one of said terminal hooks, and the cords G and F, extending under the right-hand side of the train as the train stands reversed, are connected together by hooking their terminal hooks into the chains L and L', in the same manner as above described.

In order that a car may be passed and its brakes be left without being operated when those of the other cars in a train are operated, the said pairs of brakes D, attached to any car in a train of cars, may before starting the train be disconnected and detached from said cord G by unhooking the connecting-chains L from the terminal hooks of said cord G, connecting the brakes of such car with the brakes D of the other cars in the train, and by unhooking the terminal hooks of the two branch adjusting-cords F' from the rings $f$, fastened to the cord F under the same car. When so detached, the detached ends of the branch adjusting-cords F', must be brought down in front of the sheaves E' and be wound tightly around the bar C³, in order to keep the said shortest radius of the said eccentricated sections of wheels or half-ellipses or cams D extended vertically toward the rails, and thus the brakes D of such car be held in their position of rest. When a car is so passed, the cord G under the car next forward of it is extended slack, as above described, by a similar cord, G, and the chains L, attached thereto by hooks or otherwise to and connected with the corresponding cord, G, under the next car to the rear of it by the chain L and the hooks at the ends of the cords hooked therein or otherwise.

Any number of cars in a train may be passed in the same manner as above described when it is desirable not to operate the said brakes D, attached to them, and thereby the brakes D, attached to any particular car or to any particular number of cars or group of cars in a train, may be operated, while the operation of those attached to the passed cars is suspended. By disconnecting the said cord G from said chains and said branch adjusting-cords from said rings $c'$ at any point in the train, the operation of all the brakes of all the cars to the rear of such disconnection is suspended unless the cord G is extended to and connected with the brakes D of some car to the rear of such disconnection, as already above stated and described. Should it become necessary in thus passing cars, and even when not passing cars, the said cords extending under them may be supported by hangers attached to the bottom of the cars.

It is obvious that the stopping of a train of cars by operating said brakes is effected more or less quickly, according to the increase or the diminution of the number of said brakes connected together, as above described, for co-operation.

To prevent any tendency of the rear cars of a train to telescope the forward cars, by operating the brakes of the forward car or cars alone a smaller number of forward cars may have their brakes operated in co-operation with the brakes of one or more of the cars farthest toward the rear of the train, leaving the operation of the brakes D of any number of the intermediate cars in the train suspended, as above described.

Every forward section of the cords G and F, at a short distance, (about fifteen inches,) from the forward ends thereof, respectively, under the forward part of every car in the train, and every section of the cord G between the two pairs of brakes under every car in the train, is replaced, to a limited extent, with spiral springs N in the cord G and N' in the cord F, or other suitable springs inserted therein and firmly connected therewith, so as to form and constitute a part of the extension thereof. Said springs are of the same strength as said cord G, and are of sufficient dimensions and length to elongate and contract about eight inches when subjected to an extraordinary strain, as when the train of cars is moving on a curve, and to elongate slightly when suddenly twitched by the brakes when they first acquire traction on the rails while being operated, but not to elongate by the strain upon the cords when being operated by the power of the lever $I^2$ in operating the brakes D. Every rear section of the cords G and F, at a short distance, (about fifteen inches,) from the rear ends thereof, respectively, under the left side of the rear part of every car in the train, and every section of the cord G between the two pairs of brakes under the left side of every car in the train, is replaced to a limited extent with a spiral spring, N, in the cord G and N' in the cord F, or other suitable springs inserted therein and firmly connected therewith, so as to form and constitute a part of the extension thereof. Such springs are of the same strength as said cord G, and are of sufficient dimensions and length to elongate and contract about eight inches when subjected to an extraordinary strain, as when the train of cars is moving on a curve, and to elongate slightly when suddenly twitched by the brakes D when they first acquire traction on the rails while being operated, when the car is reversed in the train, or when the locomotive-engine is changed to the other end of the train to draw it in the reverse direction, but not to elongate by the strain upon the cords when being operated by the power of the lever $I^2$ in operating the brakes D.

Cords similar to the cords G and F, with hooks and springs like those above described, connected therewith in the same manner as those above described, are connected with said cords G and F, are extended under the left side of every car in the train, and are connected with the arms or levers $C^1$, attached to the rock-shaft $C^2$ on that side of the car, and terminate at the ends of the car in the same manner as, but in reverse order to, those extended under the right side of the car, so that when a car is reversed in a train, or the locomotive-engine is changed to the other end of the train to draw it in the opposite direction, the said springs in the cords will be near the forward end of the car as it stands after it is reversed, or after the locomotive-engine is changed to the other end of the train, and the terminal hooks of the cords can be promptly connected with the chains L and L', as above described.

The operation of the device is as follows: When power is applied to the lever $I^2$, so as to rotate the same and the wheel I rearward through the space of about forty-five degrees of its circumference, motion is transmitted thereby through the consequent winding of said cord J over and upon said wheel I to the drum H, causing it to wind up the cord $G^2$, whereby rotating power is transmitted to the arms or levers $C^1$ under the tender or first car, rotating or rocking them forward through a space of about forty-five degrees of a circle, whereby the rock-shaft $C^2$ and the axles of the brakes D, to which they are attached, are rotated to the same extent, and the brakes D, mounted on their said axles, are thereby rotated forward to the same extent and their periphery thereby brought down to and in firm contact with the rails, by means whereof and of the momentum of the car and its load the brakes D acquire traction on the rails and rotate thereon until their elevated end is stopped by the barrier $A^2$, as shown in Fig. 8, thereby elevating the car-wheels sufficiently high to neutralize instantaneously and totally all their traction, but not high enough to deprive the flanges of the car-wheels of their normal and effective operation against the rails, and forcing the brakes D to slide on their shoes D' on the rails. The motion of the first two pairs of the brakes D, transmitted to them, as above described, is, through the cords G, automatically transmitted from them to the next two pairs of the brakes D of the next car to the rear by the said acquired traction and consequent partial rotation of said first two pairs of brakes; and the said motion of the said second two pairs of brakes is in like manner transmitted from them to the two pairs of brakes of the next car to the rear, and so on in quick succession throughout the train till all the brakes D are set and completely operated, thereby generating friction, which speedily absorbs the momentum and stops the motion of the train, and stops it more or less speedily, according to the increase or diminution of the number of the brakes connected together for co-operation before starting the train.

When the wheel I and the drum H are rotated to operate the brakes, as above described, the cord $F^2$ is paid out from the drum H and the branch adjusting cord $F'$ moves backward and downward over the left sheave of the sheaves $E'$, permitting the arms or levers $C^4$ to rotate forward. When the train of cars has been stopped by the operation of the brakes D, the momentum which has rotated the brakes down to and upon their shoes and sustained them in that position instantaneously ceases. This support ceasing, the weight of the car and of its load, if any, resting on the brake-axles, and the shoes of the brakes being several inches forward from a line extending perpendicularly downward from the center of the brake-axles, the gravity of the car and of its load, if any, aided by a retrograde movement of the engine and train, as hereinafter described, rotates the brake-axles partially backward automatically, bringing the car back upon its trucks and the car-wheels back upon the rails, thereby automatically liberating the brakes; and to prevent any resistance of the locomotive-engine to this automatic action by any strain upon its couplings with the tender or the first car in the train, this strain is stopped by a reversal of the locomotive-engine and a bckward motion thereof, sufficient to allow and to aid the gravity of the car and of its load, if any, to liberate its brakes. When the gravity of one car and of its load, if any, is in like manner allowed and aided to liberate its brakes, the next car in its rear in the train is thereby also released from the forward strain of its couplings and its gravity permitted and aided in like manner to liberate its brakes, and if when so liberated their own gravity should not bring them automatically to their exact position of rest, they may be brought into this position by a reverse operation of the lever $I^2$, which, through the cord $J'$, rotates forward the drum H, thereby winding thereon the cord $F^2$ and drawing forward the cord $F$, whereby the branch adjusting-cords $F'$, connected with their rings in the bars $C^3$, and the extreme end of the cord $F'$, connected with the ring in the bar $C^3$ farthest to the rear under the last car in the train, rotate the arms or levers $C^4$ backward till the brakes are thereby brought to their exact position of rest, and they are held in this position by the lever $I^2$ being loosely confined within the easy-working C-spring $i$, above described, from the embrace of which it is easily and readily removed by the hand of the engineer in operating the brakes.

In case of the suspension of the operation of any of the brakes D in a train of cars, as above described, and also in case of the coupling of one or more cars not equipped with the brakes D, above described, together with a train equipped therewith, and of stopping the motion of a train by operating the brakes D as safety-brakes, whereby the juxtaposed buffers of such cars in the train incline to come together in close contact with each other and with those at the rear end of the next car forward of them in the train while moving on a level track, and whereby also the juxtaposed buffers of all the cars in a train incline to come together in close contact while descending a downgrade, the brakes D are operated as follows, to wit:

Sections of the cords G and F with terminal hooks, as above described, being from their respective connections, with their respective chains L and $L'$, extended rearward under the whole length of such cars in the train as are not equipped with the brakes D, the former being connected with the forward end of the forward section of the cord G and the latter with the forward end of the forward section of the cord F, by their respective terminal hooks being hooked into their respective chains L and $L'$, connected with the brakes D, as above described, of the first car equipped therewith, toward which said sections of the cords G and F are so extended rearward, as above described, the engineer, before operating the brakes D as safety-brakes, by his whistle signals " down brakes," whereupon the present windlass-brakes, with which such cars in the train are equipped as are not equipped with the brakes D in working order, are operated by brakemen, whereby the forward couplings of such cars, coupling them with each other and with the cars forward of them in the train and all the other couplings in the train are extended to their extreme length; but if the train terminates with cars equipped with the brakes D to the rear of such cars as are not equipped therewith in working order, or if all the cars in the train are equipped with the brakes D, the brakes D of one or more of the terminal cars at the rear of the train may be operated and set from the cab by the fireman or the engineer by the device hereinafter described for operating a part of the safety-brakes D as ordinary train-brakes, as hereinafter described, whereby the couplings between all the cars in the train are extended to their extreme length, thus obviating the necessity of said operation of the present windlass-brakes. As soon as the effect is produced of extending all the couplings between the cars in the train to their extreme length, as above described, the brakes D are operated as safety-brakes by the engineer in the cab, and the motion of the train is thereby quickly stopped with all the couplings in the train extended to their extreme length. The strain of the couplings coupling the locomotive-engine with the tender or first car in the train being then slackened by a reversed movement of the locomotive-engine, the gravity of the cars, and of their load, if any, aided by a retrograde motion of the engine and of the cars in the train, rotates the brakes D backward in rapid succession from car to car and brings the cars down upon the trucks, and the wheels of the trucks down upon the rails, thereby liberating the brakes D; and when the brakes D are thus liberated, any tendency of the train to move forward on a downgrade may be checked by operating from the cab the brakes D at the rear end of the train as train-brakes by means of the device therefor, hereinafter described, or by reversing the engine, or both.

The use of the present windlass-brake, as above described, is restricted to cars not equipped with the brakes D in working order, and is never extended to cars equipped with the safety-brakes D as a part of the system of such safety-brakes, and it may be wholly dispensed with when a train made up in part of cars not equipped with the brakes D terminates with cars equipped with the brakes D in working order, and also when all the cars in the train are equipped with the brakes D in working order.

In case of stopping the motion of the train of cars by operating the brakes D while ascending an upgrade sufficiently high to cause the train, when its motion is thus stopped, to assume automatically a retrograde motion down such grade, such retrograde motion may be stopped and the couplings between the cars slackened in the following manner, to wit: The engineer, with his whistle, signals "down brakes", whereupon a brakeman or brakemen operate the present windlass-brakes of one car, or of more cars, if necessary, farthest to the rear of the train, commencing with those of the rearmost car. While these windlass-brakes are being thus operated and firmly set, the engineer closes the throttle-valve and operates the brakes D as safety-brakes and stops the train, whereupon the automatic retrograde motion of all the cars of the train is immediately stopped by the rear car or cars, whose retrograde motion has been already stopped, and which are now held at standstill by the operation of the present windlass-brakes, as above described, and they are all thus stopped and held at standstill before they had acquired any retrograde momentum, the effect of which is to bring the juxtaposed buffers of all the cars of the train by backward motion into close contact and to slacken the couplings between all the cars. The cars of a train are thus in a relative position to enable the locomotive-engine to again start and draw the train, by starting the cars in succession in the ordinary way. The office performed by the present windlass-brakes, as above described, is their ordinary office of station-brakes after the motion of the train is stopped by the safety-brakes D. They are not operated to even aid in the slightest degree in stopping the forward motion of the train, but merely to be ready as a barrier against its retrograde motion downgrade immediately after its forward motion is stopped by the operation of the safety-brakes D. The said system of safety-brakes D may, by the following described new and useful device invented by me, be operated as a system of ordinary train-brakes for stopping the motion of trains of cars at stations and other places in contradistinction to its normal operation as a system of safety-brakes, to wit: A grooved windlass-wheel, $C^5$, about two feet, or more or less, in diameter, is tightly mounted horizontally on the top of a windlass rod or spindle, $C^6$, of sufficient thickness and strength to rock the rock-shaft $C^2$ through the arms or levers $C^4$ and the cord or chain $G^4$, hereinafter described, thereto attached. The rod $C^6$ extends perpendicularly above the deck of freight-cars far enough to operate the windlass-wheel $C^5$ above the deck of the cars, and extends perpendicularly above the top of the platform of passenger-cars high enough to operate the windlass-wheel $C^5$ between the height of the top of the doors and the height of the deck of the cars, by a cord or chain, $G^3$, connected with the groove of the windlass-wheel $C^5$, by being hooked therein so as to be easily and quickly unhooked and disconnected therefrom, and the rod $C^6$ extends perpendicularly downward low enough to wind around it the cord or chain $G^4$ (hereinafter described) at a point thereon in the same horizontal plane with the rock-shaft $C^2$. The rod $C^6$ is so connected with the forward end of every car as to be rotated by the cord or chain $G^3$ and by the cord or chain $G^4$, as hereinafter described. The cord or chain $G^4$ is strong enough to rotate the rock-shaft $C^2$, as hereinafter described, and terminates at each end thereof with a snaffle-hook, M, one of which is attached to the cord G by being hooked into and thereby connected with the ring fastened to the forward end of the spring N in the forward section of the cord G under the same car, and is so hooked at least twelve inches directly to the rear of said rod $C^6$, the other of which is connected with the rod $C^6$ by being hooked into a ring, $c^2$, fastened to said windlass-rod $C^6$ at a point thereon in the same horizontal plane with the rock-shaft $C^2$, and for about three inches above and below the point to which the ring $c^2$ is attached the rod $C^6$ is enlarged to about twice its general diameter, and the cord or chain $G^4$, when so connected as above described, is just sufficiently slack to admit of the rotation of the rock-shaft $C^2$ backward far enough to operate and set the brakes D backward without straining the cord or chain $G^4$. The said connections of the cord or chain $G^4$ admit of its being easily and promptly disconnected, so as to be in like manner connected at will with the forward end of the spring N in the forward section of the cord G, and with said rod $C^6$ under the forward end of any other car in the train. The rod $C^6$ is placed to the right of the longitudinal center of the car, at a point in a direct longitudinal line extending forward from the arms or levers $C^4$, attached to the rock-shaft $C^2$, and is there connected with the car by suitable supports and braces firmly attached to the car, with suitable orifices in said supports, and braces at or near both ends of the rod $C^6$ to admit of its free rotation and operation therein, as above described. The said cord or chain $G^3$, of sufficient strength to rotate said windlass-wheel $C^5$ and the rod $C^6$, and through the cord or chain $G^4$ and the arms or levers $C^4$, to rotate or rock the rock-shaft $C^2$, is wound around said windlass-wheel $C^5$ in the grooves thereof from its said point of attachment thereto a sufficient number of times to rotate by pulling and drawing said cord or chain $G^3$, the said windlass-wheel $C^5$, and said rod $C^6$ a sufficient number of times to wind said cord or chain $G^4$ around said rod $C^6$ until thereby the said arms or levers $C^4$ are rotated forward, and thereby the rock-shaft $C^2$ is also rotated forward, and the brakes D, connected therewith, are thereby also rotated forward till they acquire traction on the rails. The cord or chain $G^3$ is held horizontal to the groove of said windlass-wheel $C^5$ by passing to said groove through a guiding-ring, $c^3$, supported by a small stud attached to the car, and from its said attachment to said windlass-wheel $C^5$, and its windings around the same is extended taut upon the deck of freight-cars through guide-staples $c^4$, attached to the top of every car—one at the middle and one at each end of the car—and in the case of passenger-cars through suitable orifices in the ends of passenger-cars, above the height of the doors thereof, is extended taut through the upper part of passenger-cars, supported by suitable hangers attached to the under side of the deck thereof, in sections connected together by snaffle-hooks M and rings $M^2$, attached thereto or otherwise at the ends of the cars to the engineer's cab, and taut through an orifice, $c^6$, higher than the doorway in the rear end of the cab, and on the left side thereof, and thence upon and over a grooved guiding-pulley, $C^7$, mounted on an axle attached to the inside of the cab near such orifice $c^6$, and thence inside of the cab taut diagonally forward and downward to and under and around, and is attached to a grooved drum, $c^8$, about twelve inches in diameter, which, with the windlass-wheel $C^8$ and concentric and in close contact therewith and firmly joined thereto, is mounted loosely on an axle, $c^7$, attached to and extending horizontally from and at right angles with the left side of the cab; and said windlass-wheel $C^8$ is of sufficient diameter to enable one man to rotate and operate the same and thereby wind up around said drum $c^8$ and draw forward said cord or chain $G^3$, attached thereto, and thereby rotate forward the brakes D, connected therewith through said arms or levers $C^4$, and said rock-shaft $C^2$, and said cord or chain $G^4$, and said rod $C^6$, and said grooved windlass-wheel $C^5$, till they acquire traction on the rails. The windlass-wheel $C^5$ and rod $C^6$ are similarly attached to the rear end of every car in a train, varying the height of the windlass-wheel $C^5$ and the rod $C^6$ according as the car is a freight or a passenger car, as above described, at a point in a direct longitudinal line extending rearward from the arms or levers $C^4$, attached to the rock-shaft $C^2$ on the left side of the center of the car; and similar suitable orifices are made in the ends of every passenger-car to correspond therewith, and similar cords, $G^3$ and $G^4$, connected therewith similarly to operate the same, and similar ring-studs, $c^3$, are attached to the car to guide the cord $G^3$ to the groove in the windlass-wheel $C^5$, and similar guide-staples, $c^4$, are attached to the top of the deck of every freight-car, and similar hangers attached to and under the deck of passenger-cars. In short, this entire device, except the part thereof within the cab, is in reverse order connected with the left side of every car to meet the case of the reversal of such car in a train.

The said device for operating the safety-brakes D as ordinary train-brakes is operated from the engineer's cab by the fireman or engineer revolving said windlass-wheel $C^8$, so as to wind on the drum $c^8$ the cord or chain $G^3$ till the brakes D, with which it is connected, as above described, are rotated forward, and thereby acquire traction on the rails, whereby the brakes D of the car whose brakes D are thus being directly operated and the brakes D of all the cars to the rear thereof in the train are operated and set, and the motion of the train thereby stopped; and it is stopped more or less quickly, according to the number of brakes D to the rear of those directly operated, as above described; and this device for operating the safety-brakes D as train-brakes may also be used and operated in all cases where it becomes necessary to first operate and set the brakes D of one or more of the cars equipped therewith farthest to the rear of the train before operating all the brakes D as safety-brakes, for the purpose of extending the couplings between the cars in the train to their extreme length, and of thereby placing the cars in a train in a relative position for their brakes D to be liberated by a retrograde movement of the engine moving the cars backward from car to car, as when a train is descending a long high grade.

In order to switch out of a moving train any particular car or cars and run the same upon a siding by what is called a "flying switch," the train is stopped about a mile before reaching the switch, and then the train-men immediately disconnect the brakes of such car or cars by unhooking from the chains L and L' the terminal hooks of the cords G and F and $Q^3$ under each end thereof, and by drawing rearward a few inches the cord $G^3$, and then unhooking its terminal hook from the windlass-wheel $C^5$ and unwinding it therefrom.

This is less than two minutes' work for two train-men. The train is then immediately moved onward and the flying switch performed in the usual way, after which the cars of the train to the rear of the ones switched off move up to the other part of the train, which is now nearly stopped to receive them. Then, being stopped therefor, the remaining cars of the train are again coupled together and all the brakes D of the train again connected together by the terminal hooks of said cords G and F and $Q^3$ being again hooked into their respective chains L and L' and loops $Q^{10}$, and said cords $G^3$ again wound around and hooked into a windlass-wheel, $C^5$, at the proper distance from the rear of the train to operate the brakes D as train-brakes, taking care to connect the lower end of the rod $C^6$ with the cord G by means of the cord or chain $G^4$, as already above described. With prompt action the brakes are thus reconnected together and the train in readiness in less than two minutes to again move onward. The double and triple speed secured by these brakes D amply compensate for these four minutes' delay.

In case of a disruption of a train of cars while moving on a level track, the cord F, being of less tensile strength than the cord G, is first broken and parted by the immediate increase of strain upon them occasioned by the gradual retardation of the detached fragment of the train. The extraordinary strain upon the cord G continuing thereafter, causes the lever $I^2$ to rotate forward, and in its forward rotation to strike and sound a small bell, O, in the cab, (shown in Fig. 11,) by which the engineer is promptly notified of the disruption of the train, and the said extraordinary strain also causes the levers $C^4$ and the rock-shaft $C^2$ to rotate forward, and thereby to automatically operate the brakes D of the detached fragment of the train before the cord G breaks and parts; and in case of a disruption of a train of cars while ascending an upgrade, a like notice of the disruption of the train is given to the engineer by the sounding of the bell O in the cab, occasioned by a like extraordinary strain upon the cord G, caused by the retrograde motion of the detached fragment of the train downgrade.

The wheels and axles of the detached fragment of a train of cars, disrupted, as above described, while ascending an upgrade, immediately after its momentum ceases, commence a retrograde motion downgrade. In order to stop this retrograde motion almost immediately, I have invented the following novel and useful device, which is dependent upon the said rock-shaft $C^2$ and said cord G, connecting said pairs of brakes with each other, as above described, and upon the axles of the brakes D, and upon the brakes D, and upon the car-wheels and their axles for its operation; and said brakes D are dependent upon this device for their retrograde operation, and the said system of brakes is dependent thereon for the completion of the whole of said system of safety-brakes, to wit: A band, P, of suitable width and thickness, is bound tightly around the forward axle, $S^4$, of the rear axles of every car in a train of cars by bolts and nuts or screw-bolts P', or otherwise, at a point on such axle $S^4$, equidistant from each end thereof. One of the juxtaposed ends, $P^2$, of the band P, which are bent outward at right angles with the band P, with an orifice through them, through which passes the binding nut-bolt P', is extended from the bolt P' about eight inches longer than the other, the longer one being curved from the top curve of the band P toward the rear of the car, so that its free end is elevated about four inches above the band P, and serves as a hook, $P^3$. A strong staple or eye-screw, Q, its orifice large enough to admit of the free passage through it of the cord $Q^3$, hereinafter described, is firmly attached to the rear end of every car in the train, under the bottom thereof, transversely, at a point far enough to the right of a direct longitudinal line extending rearward from a point in the same horizontal plane, vertical to the hook $P^3$, to prevent any interference of the cord $Q^3$ with the king-bolt of the rear truck and its surroundings. Several small wire cords, Q', of but one-twelfth of the tensile strength of the cord $Q^3$, are separately tied around the rim of the ring or staple Q at the rear end of the rearmost car in the train, leaving the free ends thereof hanging down about four inches from the eye-screw or staple Q, so that when one of the said small cords Q' is broken, as hereinafter described, one of the others may be used to tie the ring $Q^2$ to the staple or eye-screw Q. A similar staple or eye-screw, $Q^6$, is firmly attached to every car in the train, as hereinafter described, under the bottom thereof, transversely, and about four inches forward from a line rising perpendicularly from the front curve of the band P around the axle $S^4$. To every car in the train, under the bottom and near the forward end thereof, is firmly attached transversely a strong staple, or eye-screw $Q^9$, similar to those above described, as nearly as possible in a direct longitudinal line with the staple or eye-screw Q. A stout ring, $Q^2$, much larger in diameter than the orifice of the staple or eye-screw Q, is tied and thereby fastened to the staple or eye-screw Q, at the forward side thereof, under the rearmost car in the train, with the said small flexible wire cord Q', so that the small cord Q' will break and part and leave the ring $Q^2$ free to be drawn forward to the staple or eye-screw $Q^6$, as hereinafter described. A flexible wire cord, $Q^3$, of sufficient tensile strength to strain and part the cord Q', and also any of the loops $Q^{10}$, is by its terminal hook $m$, similar to the hooks M, above described, connected with the ring $Q^2$, so tied and fastened, as above described, to the staple or eye-screw Q, attached to the rearmost car in the train by hooking its said terminal hook $m$ therein. The said cord $Q^3$ is thence extended taut through the ring $Q^4$, loosely mounted on the cord $Q^3$, to the rear of the staple or eye-screw $Q^6$, thence taut through the orifice of the staple or eye-screw $Q^6$, hereinafter described, and thence supported by suitable staples or hangers, $Q^{11}$, under and near the bottom of the car, extended taut through the staple or eye-screw $Q^9$ to and passing through the orifice of the staple or eye-screw $Q$, attached to the rear of the next car in front in the train, under the bottom thereof, and is there connected with the ring $Q^2$ under such car by its other terminal hook $m$ being hooked into one of several small flexible wire-cord loops $Q^{10}$, about two inches in length, drawn rearward through the staple or the ring of the eye-screw $Q$, and composed of wire cord of not more than twice the tensile strength of the small wire cord $Q'$, looped and linked into the ring $Q^2$, thereby holding the ring $Q^2$ against the front side of the staple or eye-screw $Q$ when the couplings between the cars are extended to their extreme length, so that when the cord $Q^3$ is strained by the disruption of the train the small cord $Q'$ shall first break and part, and after that the loop $Q^{10}$, connected with the cord $Q^3$, shall break and part between the ends of the cars where the train is disrupted. Another section of the cord $Q^3$, with like terminal hooks $m$, is in like manner connected with this latter ring $Q^2$, and is thence extended taut through the ring $Q^4$, loosely mounted on the cord $Q^3$ to the rear of the staple or eye-screw $Q^6$, and thence taut through the orifice of the staple or eye-screw $Q^6$, attached to this latter car, and thence supported, as above described, extended taut through the orifice of the staple or eye screw $Q^9$ attached to the forward end of the car under the bottom thereof, and is thence extended to the staple or eye screw $Q$, attached to the next car in front of this latter car in the train at the rear end, and under the bottom of such car, and is there, through the orifice of the eye-screw $Q$, connected with the ring $Q^2$ under such car by one of the loops $Q^{10}$, looped into the ring $Q^2$ in the manner already above described. The cord $Q^3$ is in like manner extended in sections under and connected with every car in the train, including the tender, and from the tender is in like manner extended to and connected with the cab by its terminal hook $m$ in its forward end, being hooked into a loop, $Q^{10}$, connected with the staple or eye-screw $Q$, and thereby connected with the staple or eye-screw $Q$, attached to the cab near the rear end and under the bottom thereof, similar to those above described.

Vertical to a point about four inches forward from the band P around the axle $S^4$, being the forward axle of the rear truck of every car in a train, a staple or eye-screw, $Q^6$, is attached to the car under the bottom thereof, transversely, with an orifice sufficiently large to admit of the free passage through it of the cord $Q^3$ with the knob $Q^5$, larger in diameter than the orifice of the ring $Q^4$, and with conical ends attached firmly thereto. The office of said knob $Q^5$ is to force and slide back on the cord $Q^3$ the said ring $Q^4$ to its normal position, when the cord $Q^3$ is drawn back and the ring $Q^2$ is again tied to the staple or eye-screw $Q$ after a disruption of a train. A cord, $Q^7$, similar to the cord $Q^3$ is, at one end thereof, attached to the ring $Q^4$, through the orifice of which moves and passes easily backward and forward the cord $Q^3$, which ring $Q^4$ is normally held by the knob $Q^5$ far enough to the rear of the staple or eye screw $Q^6$, under every car in the train, to let the loop $S^2$, which it suspends by means of the spring $S^3$ under every car in the train, as hereinafter described, descend down low enough for the hook $P^3$ to hook and catch into it, as hereinafter described, and is thence extended through the orifice of the ring $Q^8$, attached firmly to the bottom of the staple or eye-screw $Q^6$, and thence downward from the front of the ring $Q^8$, under every car in the train; and near the ring $Q^8$ its end is connected with and suspends vertically to said point, about four inches forward from said band P around the axle $S^4$, a small clasp-spring, $S^3$, the jaws $s$ thereof extending downward in close contact with each other, and held tightly together by the elastic force of the spring $S^3$, and the free end of each of the jaws $s$ curving outward at least six inches above the free end of the hook $P^3$ as it rotates upward. An arm or lever, S, of sufficient strength to rock the rock-shaft $C^2$, and the brakes D, connected therewith, its upper end terminating with a ring, $s'$, is, under every car in the train, firmly attached to the top of said rock-shaft $C^2$, at a point thereon equidistant from each end thereof, and when the brakes D are at rest extends perpendicularly upward therefrom sufficiently high to enable the cord S', hereinafter described, to easily rock the rock-shaft $C^2$ and said brakes D, connected therewith. A cord, S', similar to the cord G, with a terminal hook, $m$, attached to one end thereof, similar to the hooks M, above described, and sufficiently strong to rotate, as hereinafter described, the arm or lever S and the rock-shaft $C^2$, to which it is attached, and the brake-axles C, to which the rock-shaft $C^2$ is attached, and the brakes D, mounted thereon, is, under every car in the train, connected with said arm or lever S by its said terminal hook $m$ being hooked into said ring $s'$, and its free end is thence extended to the clasp-springs $S^3$. The free end of the cord S' is formed into a strong loop, $S^2$, about three inches in diameter, and the cord S', close to its junction with the loop $S^2$, is forced in a horizontal position upward between the jaws $s$ of the spring $S^3$, and is there tightly clasped and held and supported thereby horizontally, the loop $S^2$ extending horizontally rearward therefrom, thereby suspending the loop $S^2$ vertically and transversely to the hook $P^3$, when its point or free end is being rotated upward in front of the axle $S^4$, about six inches above the free end of the hook $P^3$. The cord S, when so connected at each end thereof, as above described, must be slack enough to permit the rock-shaft $C^2$, with which it is connected, to rotate forward far enough to operate and set the brakes D forward without straining the cord $S'$.

In order to meet the contingency of the reversal of a car in a train, the last above-described device should be in the same manner connected with the left side of every car in the train, but in reverse order, so as to be ready, when reversed in the train, to be connected from car to car, as above described, and to be operated, as hereinafter described.

The operation of the above-described device for stopping automatically the retrograde motion downgrade of the detached fragment of a train of cars, when disrupted while ascending an upgrade, is as follows, to wit: When a train of cars is disrupted while ascending an upgrade, which is so high as to cause the detached fragment of the train to assume automatically a retrograde motion downgrade, the retarding motion of the detached fragment of the train and the continued forward motion of the part of the train still connected with the locomotive-engine draw and strain the cord $Q^3$, and thereby break and part the small cord $Q'$, and then draw the cord $Q^3$ forward till the rings $Q^1$ and $Q^2$ are thereby drawn against the rear side of the staple or eye-screw $Q^6$, and the cord $Q^3$ being then further strained by the same force the loop $Q^{10}$, connected therewith, is between the ends of the two cars between which the train is disrupted, broken, and parted, thereby drawing the cord $Q^7$ forward through the ring $Q^5$ with the aid of the gravity of the spring $S^3$ and of the cord $S'$, thereby letting the clasp-spring $S^3$ and the loop $S^2$, connected therewith under every car in the detached fragment of the train, descend down, so that the curve of the loop $S^2$ is suspended horizontally below and transversely to the free end of the hook $P^3$ as it rotates upward when the car-wheels and axles have automatically assumed a backward rotation. When every axle $S^4$, to which the hook $P^3$ is attached in the detached fragment of the train, assumes a backward rotation, the hook $P^3$ hooks and catches into the descended loop $S^2$ and draws it forcibly away from the spring $S^3$, carrying it around the axle $S^4$, and thereby winding the cord $S'$ around the axle $S^4$, and thereby drawing the cord $S'$ rearward, thereby rotating the arm or lever S, the rock-shaft $C^2$, and all its attachments backward under every car in the detached fragment of the train, thereby automatically operating and setting all the brakes D backward under every car in the detached fragment of the train, and thereby stopping its retrograde motion almost immediately and before it has acquired any momentum.

Immediately after the sound of the bell O shall have notified the engineer of the disruption, he closes the throttle-valve of the locomotive-engine, operates the brakes D of the cars still connected with the engine, and thereby quickly stops their motion, reverses their motion, again couples the parts of the train together, and the couplings between the cars now being all slack and in order for starting, he quickly moves the train up the grade to a level track, where it is stopped. The ring $Q^2$ is then drawn backward and again tied, and thereby fastened to the staple or eye-screw Q in the same manner as before, thereby drawing backward the cords $Q^5$ and $Q^7$, and elevating the springs $S^3$ from the hooks $P^3$ to their normal position above the same. The cord $S'$ is replaced between the jaws $s$ of the springs $S^3$ in the same manner as before, and the terminal hook $m$ of the cord $Q^3$ is hooked into another one of the several loops $Q^{10}$, and if any other loop or loops $Q^{10}$ be broken and parted at the end of any other car or cars in the same detached fragment of the disrupted train, the terminal hook $m$ of each section of the cord $Q^3$ is hooked into another loop $Q^{10}$, attached to the corresponding ring, $Q^2$, and the train again moves forward. The aggregate time of these stops of the train with the prompt action of a reasonable number of train-men will never exceed three minutes.

Having described my invention, I claim—

1. In combination with the frame of a railway-car, and suitably attached thereto, the double-eccentric or double-cam form brakes D, each mounted on its respective short axle C, and connected together in pairs by the rock-shaft $C^2$, attached to the inner ends of said axles, the said brakes being arranged to act upon the rails of the road over which the car is moving, substantially as above described, and for the purposes above described.

2. The double brake-axle jaws or guards A, constructed with suitable bearings for the brake-axles C, with the brakes D, mounted thereon, and the rock-shaft $C^2$, connecting together in pairs the said brake-axles C, with the said brakes D, mounted thereon, in combination with each other and with a railway-car, substantially as above described, and for the purposes above described.

3. The brake-shoe $D'$, connected and combined with each end of the double-eccentric or double-cam form brakes D, so as to be operated and made to slide in either direction directly and immediately upon the rails, substantially as above described, and for the purposes above described.

4. The cuneiform barrier $A^2$ between each pair of said jaws A, in combination with said brakes D, substantially as above described, and for the purposes above described.

5. The elastic cushions $a$ or the springs attached to the surface or face of the cuneiform barrier $A^2$, in combination therewith and with said brakes D, substantially as above described, and for the purposes above described.

6. The axle-seat boxes or bearings $C'$ with their set-screws or keys $c$, in combination with the axles C and the jaws or guards A, substantially as above described, and for the purposes above described.

7. The transverse beams B and $B'$ and the braces $A'$, in combination with each other and with the brake-axle guards or jaws A, and with the brakes D, and with the mechanism for rotating or rocking them down to the rails, and with the frame of the car, substantially as above described, and for the purposes above described.

8. The arms or levers C⁴, in combination with said rock-shaft C², and with said axles C, and with said brakes D, and with the cord G, and with all the above-described mechanism for partially rotating or rocking said brakes D down to and in contact with the rails, substantially as above described, and for the purposes above described.

9. The wheel I, mounted on its axle I', and its actuating-lever I², and the cord or chain J, in combination with each other and with the drum H, and with the cord G², and with the chain L, and with the cord G and its terminal hooks M, and with the arms or levers C⁴, and with the rock-shaft C², and with the axles C, and with the double-eccentric or double-cam form brakes D, substantially as above described, and for the purposes above described.

10. The drum H and the cord or chain J', in combination with the motor-cord G² and the adjusting-cord F², substantially as above described, and for the purposes above described.

11. The drum H, actuating or motor cords G² and G, the levers C⁴, the rock-shaft C², the axles C, and brakes D, combined substantially as above described, and for the purposes above described.

12. The drum H, adjusting-cords F², F, and F', sheaves E', levers C⁴, rock-shaft C², axles C, and brakes D, combined substantially as above described, and for the purposes above described.

13. The cords G and G², hooks M, chains L, arms or levers C⁴, rock-shaft C², and brakes D, mounted on their axles C, in combination with each other and with a railway-car, substantially as above described, and for the purposes above described.

14. The cords F and F², the hooks M' and chains L', combined and arranged substantially as above described, and for the purposes above described.

15. The combination of the lever I² with the wheel I, mounted on the axle I', substantially as above described, and for the purposes above described.

16. The springs N, in combination with the actuating or motor cord G, substantially as above described, and for the purposes above described.

17. The springs N', in combination with the adjusting-cord F, substantially as above described.

18. The rod E, with the sliding frame E² mounted thereon, and the sheaves E', combined substantially as above described, and for the purposes above described.

19. The combination of cords G and G², with the cords F and F², of so much less tensile strength than that of the cords G and G² as to insure the breaking and parting of one of the sections of said cords G and said cord G² after, and not till after, the disruption of one of the sections of the said cord F and said cord F², in case of a disruption of a train of cars, substantially as above described, and for the purposes above described.

20. The chains L', connected and in combination with the cord F² and with the sections of the cord F, and with the cords F' and their terminal hooks M, and with the levers C⁴ and brakes D, mounted on their axles C, and with the drum H and cord or chain J', substantially as above described, and for the purposes above described.

21. The cords G² and F² under the cab, and the cords G and F under the tender, and the drum H, constructed and combined together, and with the succeeding cords G and F under the train of cars, so that the said cords G and F under the train of cars will be of less tensile strength and consequently disrupt sooner than their said connecting-cords under the engine-cab or the tender, substantially as above described, and for the purposes above described.

22. The combination of the brakes D with the frame of the car and with the trucks of the car, when the trucks of the car are connected with the car by king-bolts, either with or without keys therein, near the lower ends thereof.

23. The band P, with its hook P³, in combination with the car-axle S⁴, substantially as above described, and for the purposes above described.

24. The disruption-cord Q³, its branch cord Q⁷, with its guide Q⁸, the attached spring cord-holder S³, the looped cord S' and S², the lever S, and the hook P³, combined substantially as above described, and for the purposes above described.

25. The disruption-cord Q³, its concentric sliding ring Q⁴, the knob Q⁵, and the guiding post and stop Q⁶, combined substantially as and for the purposes above described.

26. The disruption-cord Q³, with its terminal hook m, the ring Q², the attaching small cords or ties Q', and the rearmost retaining-post or eyebolt, Q, in the train, combined substantially as and for the purposes above described.

27. The combination of two adjacent disruption-cords, Q³, with their terminal hooks m, intervening rings Q², and small looped cords Q¹⁰, substantially as above described, and for the purposes above described.

28. The small tying-cords Q', attached to the eyebolt or guide Q, and arranged to tie the rings Q² to the said eyebolt Q, at the rear end of every train, substantially as and for the purposes above described.

29. The brakes D, with their axles C, rock-shaft C², retrograde lever S, cord S', loop S², hook P³, and car-axle S⁴, combined substantially as above described, and for the purposes above described.

30. The combination of said brakes D with a railway-car at points or places under the car, substantially as above described, and for the purposes above described.

31. The actuating-wheel $C^8$, mounted on its axle $c^7$ on the left side of the locomotive-cab, drum $c^8$, mounted on said axle $c^7$, pulley $C^7$, mounted on its axle, orifice $c^6$, cord $G^3$ in sections, terminating with a hook, M, at the rear end of each section thereof, and terminating with a ring, $M^2$, at the other end thereof, guiding-staples $c^4$, grooved wheel $C^5$, mounted on the top of the rod $C^6$, rod $C^6$, connected with a car, ring $c^2$, cord or chain $G^4$, connected with the ring $c^2$ and with the rod $C^6$ and with the cord G, in combination with each other and with the cord G, and with the arms or levers $C^4$, and with the rock-shaft $C^2$, and with the brake-axles C, and with the brakes D, mounted thereon, and with the brake-axle jaws A, and with the frame of the car, substantially as above described, and for the purposes above described.

32. The longer or elongated arm or lever of the arms or levers $C^4$, attached to the rear rock-shaft $C^2$ of a car, in combination with the shorter arms or levers attached to the rock-shafts $C^2$ of the same car and of the next car in its rear in the train of cars, and with the cords G, hooks M, chain L, and rock-shafts $C^2$, and brakes D, mounted on their axles C, and the jaws $A^2$ of the same car and of such next car to the rear thereof in the train of cars, substantially as above described, and for the purposes above described.

CYRUS K. CORLISS.

Witnesses:
 PHILIP E. RAQUÉ,
 J. B. THURSTON.